United States Patent [19]

Faroudja

[11] Patent Number: 4,459,613
[45] Date of Patent: Jul. 10, 1984

[54] METHOD AND APPARATUS FOR AUTOMATIC ADJUSTMENT WITH PILOT SIGNAL OF TELEVISION IMAGE PROCESSING SYSTEM

[76] Inventor: Yves C. Faroudja, 26595 Anacapa Dr., Los Altos Hills, Calif. 94022

[21] Appl. No.: 421,828

[22] Filed: Sep. 23, 1982

Related U.S. Application Data

[63] Continuation of Ser. No. 207,918, Nov. 18, 1980, abandoned, which is a continuation-in-part of Ser. No. 57,701, Jul. 16, 1979, Pat. No. 4,262,304.

[51] Int. Cl.$^3$ .......................... H04N 5/44; H04N 9/491
[52] U.S. Cl. ...................................... 358/167; 358/37; 358/166; 358/318; 360/27
[58] Field of Search .................. 358/36, 37, 166, 167, 358/315, 318, 319; 455/50, 52, 63, 70; 369/48; 360/27, 28, 33

[56] References Cited

U.S. PATENT DOCUMENTS

| | | | |
|---|---|---|---|
| 3,643,013 | 2/1972 | Lemoine | 360/65 |
| 3,906,152 | 9/1975 | Hoogendijk | 369/111 |
| 4,165,495 | 8/1979 | Takahashi | 360/65 |
| 4,263,304 | 4/1981 | Faroudja | 358/37 |
| 4,357,626 | 11/1982 | Romeas | 358/319 |

Primary Examiner—Michael A. Masinick
Attorney, Agent, or Firm—David B. Harrison

[57] ABSTRACT

A method for automatic control of non-linear image processing of a television signal subjected to degradation upon passage through a quality degrading medium is disclosed. The processing is of the type including at least one of image enhancement, and noise, ringing and interference reduction within the television signal. The method includes the steps of:

a. generating a pilot signal having an amplitude and frequency selected to be representative of video transitions most susceptible to degradation during passage through the medium;
  b. adding the pilot signal to the television signal prior to its passage through the degrading medium and before any prepassage signal processing takes place;
  c. passing the television signal through the degrading medium;
  d. enhancing the television signal with image enhancement processing following its passage through the degrading medium and performing the additional steps of:
  (1) recovering the pilot signal;
  (2) converting the recovered pilot signal to an automatic adjustment control signal which is related to the amplitude of the recovered bursts;
  (3) automatically controlling the adjustments of the image enhancement processing with the automatic adjustment control signal; and preferably, although not necessarily,
  (4) removing the pilot signal bursts from the enhanced television signal upon completion of the image enhancement processing.

15 Claims, 3 Drawing Figures

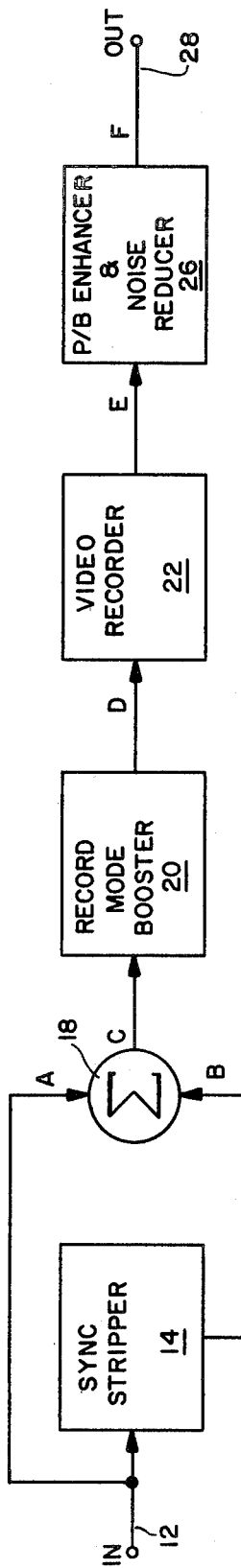
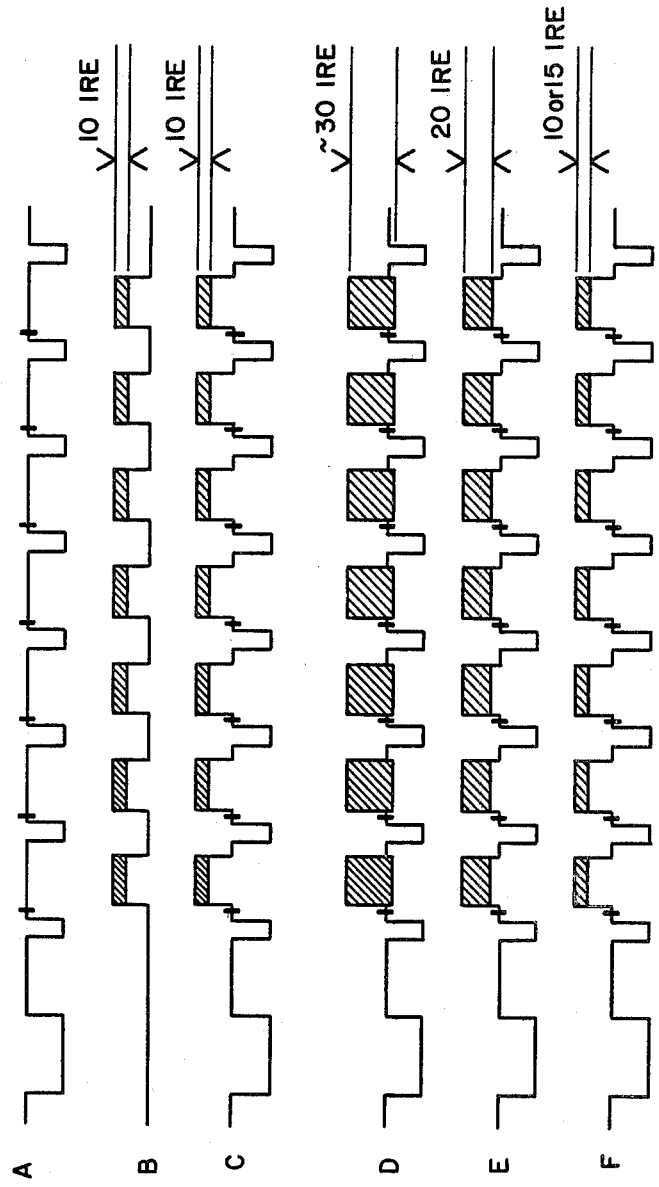
FIG. 1
FIG. 3

METHOD AND APPARATUS FOR AUTOMATIC ADJUSTMENT WITH PILOT SIGNAL OF TELEVISION IMAGE PROCESSING SYSTEM

This application is a continuation of application Ser. No. 207,918 filed Nov. 18, 1980, abandoned, which is a continuation-in-part of prior application Ser. No. 57,701 Filed July 16, 1979, now U.S. Pat. No. 4,262,304.

BACKGROUND OF THE INVENTION

The present invention relates to methods and apparatus for automatic adjustment of processing systems to achieve improvement in the apparent quality of television pictures subjected to degradation from passage through a distorting medium, such as a limited bandwidth video recorder. More particularly, the present invention relates to a method and apparatus for providing a pilot burst standard in the picture signal before degradation which, when recovered, is used for automatic adjustment of subsequent electronic enhancement processing of the signal.

Electronic enhancement techniques and systems for improving the subjective quality of television images are known. The need for enhancement has arisen particularly within the environment of industrial grade three-quarter inch video tape recorders of the helical scanning head variety. Those recorders are characterized by a limited bandwidth of about 2.5 M.Hz and are further characterized by a "coring" effect in the reproduced images. "Coring" means that the reproduced image has a cartoon-like appearance of large image outlines with washed out fine picture details. This phenomenon occurs within inexpensive video recorders because they provide even less bandwidth, not much over 1 MHz, for small level picture detail transitions, such as those on the order of 10 IRE units or less.

The present inventor has been active in the area of developing non-linear enhancement systems for television signals which have become degraded in processing, particularly video recording with industrial grade and consumer grade tape and cassette recorders. Apparatus and methods for video crispening by shortening video transition times are disclosed in the present inventor's U.S. Pat. No. 4,030,121. Noise reduction techniques are set forth in the present inventor's U.S. Pat. No. 4,121,211. Methods and apparatus for separation of chrominance and luminance with adaptive comb filtering techniques in a quadrature modulated color television system are described in the present inventor's U.S. Pat. No. 4,179,705 and in his co-pending U.S. patent application, Ser. No. 06/068,215, filed Aug. 20, 1979, now U.S. Pat. No. 4,240,105. A low level transition signal booster for television is described in the present inventor's U.S. patent application Ser. No. 06/057,701, filed July 16, 1979, now U.S. Pat. No. 4,262,304. The methods and systems described in these patents have worked excellently, providing however, that the operator has properly made adjustments required in order to bring about enhancement and improvement in subjective picture image quality.

A problem has arisen with the foregoing image enhancement techniques in that each requires a number of settings and adjustments in order to achieve enhancement that truly improves subjective image appearance. When the above systems are combined into a single overall enhancement system, the number of manual adjustments becomes large, and operator subjectivity and bias and consequent errors tend to nullify the capabilities of the enhancement systems to improve and enhance image quality. Typically, studio technicians have "painted" television images by making manual adjustments. Some technicians have been lacking in artistic ability. Others have been hampered by poorly operating or aligned color monitors. Ambient lighting and environmental color concentrations have detracted in the manual adjustment of enhancement processes.

Consequently, a need has arisen to provide an objective measurement of a subjectively balanced picture. The present inventor has discovered that a good model of subjectively pleasing fine picture details is provided in a minus 20 DB 2T sine square test pulse at 100% amplitude. If the test pulse is over 100% amplitude the image will have an excess of detail, while if under 100%, the picture will be lacking in detail. The present inventor has also discovered that a 1.7 MHz pilot test signal burst, preferably located in and occupying otherwise unused portions of the television signal, such as e.g., lines 10 to 16 on the back porch of the vertical sync pulse interval, provides an excellent emulation of the desired sine square pulse and provides an objective standard upon which to base and to adjust automatically the subjective enhancement and balancing of fine picture details in a television system subject to degradation in e.g. reduced bandwidth video recording.

SUMMARY OF THE INVENTION

With the foregoing background of the present invention in mind:

A general object of the present invention is to provide for the automatic adjustment of television image enhancement systems to overcome the drawbacks from manual adjustments subject to human choices and error in order to achieve automatically the appearance of a full bandwidth picture.

Another object of the present invention is to select and include a pilot reference signal in the television signal wherein the pilot is chosen to be particularly sensitive to degradation of the signal in processing or storage, as in a limited bandwidth video recording medium.

A further object of the present invention is to subject a pilot burst reference signal to video processing having a predetermined degradation and then to recover the pilot and utilize it to provide an automatic, standardised adjustment to video enhancement, crispening and noise, ringing, and interference reduction processes through which the video passes after degradation has occured.

Yet another object of the present invention is to combine a plurality of known television image enhancement systems into a single system and to utilize a pilot burst reference signal to provide automatic adjustments to the overall system.

A still further object of the present invention is to introduce a small transition level pilot reference signal into a video data stream immediately prior to image enhancement processing before degradation occurs, provide preprocessing which boosts levels of small transitions above rolloff of the degrading medium, provides subsequent processing to remove noise, ringing and interference and to sharpen the picture automatically with the pilot, and to remove the pilot following the processing after degradation.

One more object of the present invention is to provide an objective standard for automatically adjusting video image enhancement systems to achieve a television picture having subjectively balanced and visually pleasing fine picture details.

The foregoing objects are achieved in a television enhancement system which includes a pilot burst reference signal generator. The generator creates a predetermined pilot burst signal and inserts it into a composite video data stream at the head end of a signal path, and before any enhancement pre-processing occurs. The system may include an enhancement pre-processor, such as a record mode low transition level signal booster. The system also includes a post-degradation processor which may include image crispening and noise reduction enhancement processes. The post-degradation processor recovers the pilot, converts it into an automatic enhancement adjustment signal which is related to the amplitude of recovered pilot bursts preferably averaged over a predetermined number of frames, and uses the adjustment signal to adjust automatically the operation of the post degradation processor. Finally, the burst is preferably removed from the television signal before it leaves the system so as to eliminate unnecessary artifacts from the signal after processing is completed.

The method of the present invention includes the steps of:

a. selecting an amplitude level and frequency for a pilot signal most likely to suffer degradation during passage through a degrading medium;

b. adding the selected pilot signal to the television signal prior to passage through the degrading medium and before any enhancement preprocessing of the television signal;

c. passing the composite television signal through the degrading medium, such as a limited bandwidth video recorder;

d. providing post-degradation image enhancement processing to the degraded composite television signal, including the additional steps of:

(1) recovering the pilot signal;

(2) converting the recovered pilot signal into an automatic enhancement adjustment control signal which is related to the recovered amplitude of the pilot;

(3) applying the adjustment signal to the post-degradation image enhancement processes to achieve automatic adjustment thereof in accordance with the adjustment signal; and, preferably, but not necessarily, (4) removing the pilot signal from the enhanced television signal upon completion of post-degradation enhancement processing.

These and other objects, advantages and features will be apparent to those skilled in the art upon consideration of the following detailed description of a preferred embodiment of the invention, presented in conjunction with the accompanying drawings.

BRIEF DESCRIPTION OF THE DRAWINGS

In the drawings:

FIG. 1 is an overall block diagram of a television image enhancement system incorporating the principles of the present invention by including a pilot burst for automatic enhancement adjustment after signal degradation.

FIG. 3 is a waveform diagram series which illustrate the FIG. 1 system processing of the pilot burst and which illustrate the use of the pilot burst as a reference for automatic adjustment of post-degradation image enhancement.

DETAILED DESCRIPTION OF A PREFERRED EMBODIMENT

Figure 2:
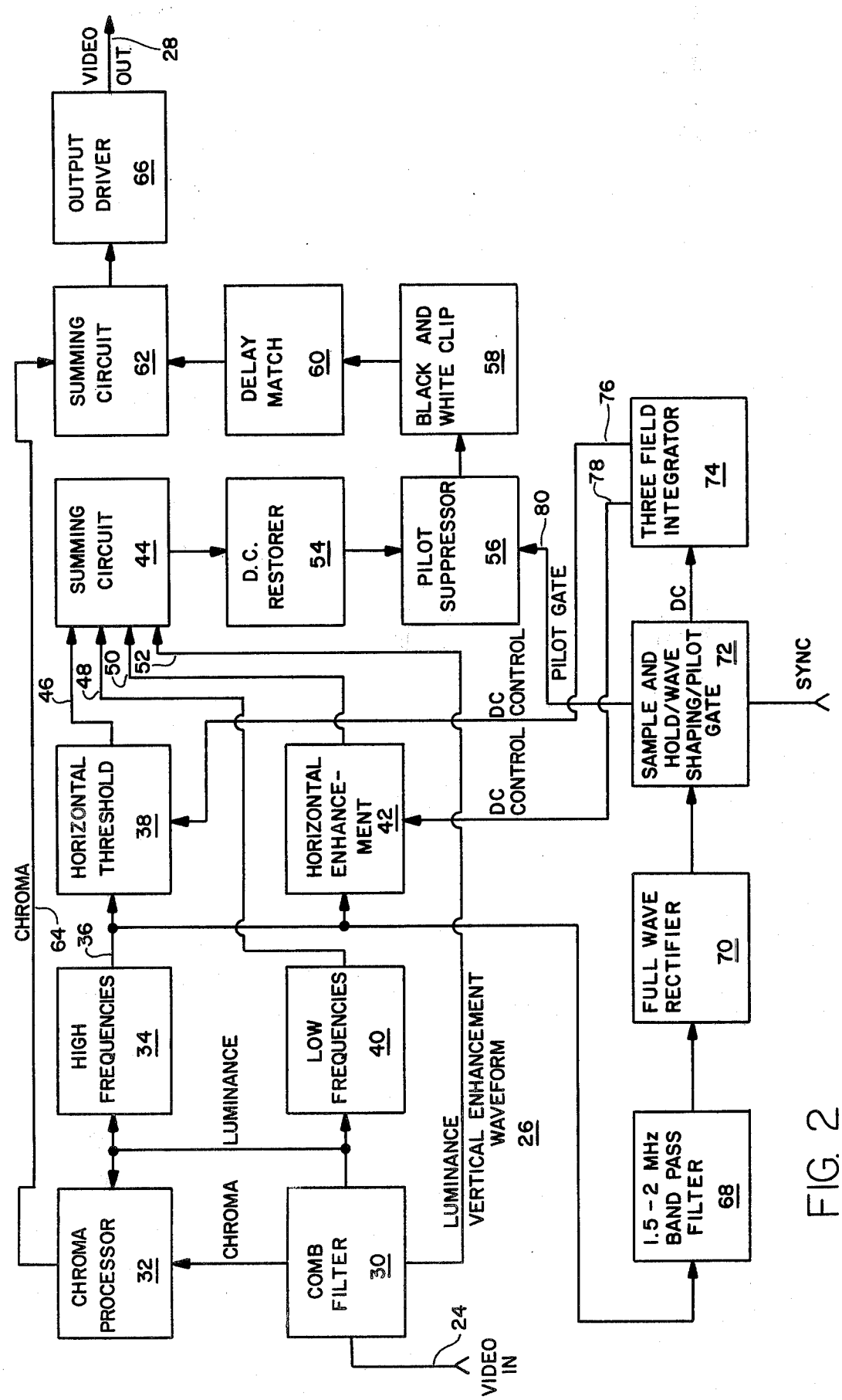
FIG. 2 is a detailed block diagram of a post-degradation image enhancement subsystem within the system set forth in FIG. 1.

A system 10 which achieves automatic adjustment of one or more non-linear image inhancement subsystems operating upon a television signal degraded during passage through a limited bandwidth medium is depicted in the overall system block diagram set forth as FIG. 1. Therein, an input 12 receives a composite television signal from a source. The signal received at the input is passed through two paths, including a path to a sync stripper 14 which extracts the vertical and horizontal synchronizing pulses from the composite video.

A pilot generator 16 generates a pilot signal burst at a frequency and amplitude selected to be representative of the television signals most likely to be degraded by the limited bandwidth medium. If the medium is a helical scan video tape or cassette recorder, the burst frequency is optimally between 1.5 and 2.0 MHz. A frequency of 1.7 MHz has been found to be satisfactory. The sinusoidal pilot burst is placed in the vertical sync interval, preferably at lines 10 through 17, with burst duration time to be about 52 microseconds so as not to interfere with color burst or line sync. The amplitude of the burst is set at about 10 IRE units.

A summing circuit 18 adds the pilot bursts to composite video from the input 12, such as in the back porch of the vertical sync interval in lines 10 through 16 (FIG. 3B). Thereafter, the combined signal passes through the signal degradation medium, such as a limited bandwidth video recorder 22, via a record mode booster 20, preferably of the type described in my co-pending U.S. patent application Ser. No. 06/057,701 filed July 16, 1979, entitled "Low Level Transition Signal Booster for Television", now U.S. Pat. No. 4,262,304, the disclosure of which is hereby incorporated by reference. Comparison of the pilot signal before and after the video passes through the recorder 22 indicates the quality and quantity of signal degradation. This indication of signal degradation is subsequently used to control automatically the operation of an overall signal processor system which enhances the video signal, thereby reducing video signal degradation. The overall processor system may enhance the video signal either before or after passage through the video recorder 22.

Alternatively, the enhancement function may be shared between two processors, one before signal degradation and the other following the signal-degrading medium 22. FIG. 1 depicts this latter, preferred arrangement with the record mode booster 20 pre-boosting the signal before it passes through the video recorder 22 and a playback enhancer and noise reducer 26 removing excess pre-boost and performing other signal enhancements after the signal has passed through the signal-degrading video recorder 22. A signal related to the average amplitude of recovered pilot signal bursts is used to regulate the amount of pre-boost removed by the playback enhancer and noise reducer 26.

The video tape recorder 22 is typically of no better quality than an industrial grade, helical scan transport, with three quarter inch tape capability. This type of machine has a diminished bandwidth which is limited to 2.5 MHz rather than the requisite 4.2 MHz for broadcast quality resolution and fine picture details. This machine is even less capable of high frequency response transmission for low level transitions, and is generally limited to less than 1 MHz for 10 IRE unit transitions at any grey level. A high quality video tape recorder may be utilized as the recorder 22, with non-linear processing limited to the correction of any degradation that may be sustained because of its characteristics.

A play back enhancer and noise reducer subsystem 26 receives the video from the recorder 22 or other medium causing image degradation and performs a number of processes to enhance the quality of the picture images. These processes, which will be described shortly, are controlled automatically by the pilot burst, in order to eliminate the wide range of operator subjectivity which has plagued these corrective processes in the past. The enhancer and noise reducer 26 is described in greater detail in FIG. 2.

Turning now to FIG. 2, the video being played back from the recorder 22 comes in via an input 24 to a comb filter 30 which separates luminance and chrominance. The comb filter also achieves an enhancement of image quality in the vertical domain. The comb filter 30 may be one of the types described in my U.S. Pat. No. 4,179,705 and my co-pending U.S. patent application, Ser. No. 06/068,215 filed on Aug. 20, 1979, U.S. Pat. No. 4,240,105 (the disclosure of which is hereby incorporated by reference) for Method and Apparatus for Separation of Chrominance and Luminance with Adaptive Comb Filtering in a Quadrature Modulated Color Television System. Combed chrominance is passed through a chroma processor 32. This processor, as well as the vertical domain enhancement processor, is preferably of the type described as the Third Embodiment (Col. 11, ln 48 to Col. 14, Ln 53) in my U.S. Pat. No. 4,030,121, issued June 14, 1977 for Video Crispener, which disclosure is incorporated herein by reference. The chroma processor 32 demodulates the chroma, enhances chroma transitions in accordance with luminance transition information, reduces chroma noise, suppresses ringing, and then remodulates and puts out the chroma.

Combed luminance from the filter 30 is passed through a high frequency band pass filter 34 wherein the high frequency components of luminance (above 1 MHz) are passed through on a line 36, and the other components are attenuated. The high frequency components pass through a threshold circuit 38 providing the amplitudes thereof are in excess of a control threshold. As will be explained later on, this threshold is controlled automatically by a signal related to the average amplitude of recovered pilot signal bursts. The threshold control circuitry may be of a complex nature as is found in my U.S. Pat. No. 4,179,705 (FIG. 3 therein) incorporated by reference which may be advantageously employed with the present invention to preserve the integrity of large image signal transitions.

Low frequency components of luminance (DC to 1 MHz) from the comb filter 30 are passed through a low pass filter 40 which is complementary to the high pass filter 34 (i.e. the sum of outputs thereof equals the full bandwidth luminance).

Combed high frequency luminance on the line 36 is supplied to a horizontal enhancement subsystem 42 which may be of a prior art approach utilizing the second differentiation of the transition, or it may be of the type described in my Video Crispener U.S. Pat. No. 4,030,121 as the First or Second Embodiments. This subsystem 42 also is controlled automatically by another signal proportional to recovered pilot signal bursts.

A combiner circuit 44 receives high frequency luminance components from the threshold circuit 38 via a line 46; it receives low frequency luminance components from the filter 40 via a line 48; it receives enhanced horizontal components from the horizontal enhancement subsystem 42 via a line 50; and it receives enhanced vertical domain components from the comb filter 30 via a line 52. Proper delay matching is included in the combiner circuit 44 so that all components arrive in proper phase relationship. The summed video composite is supplied to a D.C. restorer circuit which provides a D.C. reference to the composite. Then, the composite passes through a pilot suppressor circuit 56 which blanks out the pilot on lines 10–16 in the vertical interval in accordance with a pilot burst gating signal. The composite video next passes through a conventional black and and white clipping circuit 58 to limit video excursions from 0–100 IRE units. A delay matching circuit 60 provides phase correction, and a summing circuit 62 returns enhanced chroma components via a line 64 to the composite signal. The color composite signal is amplified by an output driver 66 and put out as an enhanced color video signal at the system output 28.

The pilot burst processing portion of the play back enhancer and noise reducer 26 will now be described. Adaptively filtered luminance high frequency components are supplied to a 1.5–2 MHz band pass filter 68 via the line 36. Band pass filtered luminance, containing the 1.7 MHz pilot burst signals, is rectified by a full wave rectifier 70, and then the bursts are sampled during the occurrence of lines 10–16 by a sample and hold portion of a circuit 72. The sampled bursts are held for the duration of a field in accordance with pilot gate signals developed from composite sync. The held value is a DC signal linearly related to pilot amplitude and varying from field to field. This DC signal is then shaped by non-linear processing in the circuit 72 to provide control signals of the contour ultimately required for proper automatic adjustment of the horizontal threshold subsystem 38 and also the horizontal enhancement subsystem 42. A three field integrator 74 integrates the held and shaped DC signals over three fields, to create a flywheel dampened control signal which averages the DC control signals in real time and resists sudden changes caused by e.g. drop outs in tape playback. One DC control signal is sent via a line 76 to control the horizontal threshold level of the threshold circuit 38. Another DC control signal is sent via a line 78 to control the enhancement (crispening) level of the horizontal enhancement subsystem 42 in order to provide large transition information similar to that of a full bandwidth picture image signal. The pilot burst gate signal generated in the circuitry 72 from sync is used to control the pilot suppressor 56 via a signal line 80.

Operation of the system 10 is further explained by the waveforms A–F set forth as FIG. 3. Therein, waveform A depicts the signal appearing at the input 12 in FIG. 1 which is blanked video with color burst, as typically found on the back porch of the vertical sync interval at lines 10 to 16. Waveform B depicts the pilot bursts generated for lines 10 to 16 by the pilot generator 16 prior to addition to the composite video. Waveform C appearing at the output of the summing circuit 18 shows the resulting combination of burst and composite color video for lines 10 to 16. Waveform D appears at the output of the record mode booster 20, and it depicts the low level burst which has been boosted from 10 IRE units to about 30 IRE units, for example. Waveform E represents the degradation of high frequency, low level transition signals such as the pilot burst, which occurs in the recorder 22 or other signal degrading media. Finally, waveform F depicts the pilot burst at the output of the play back enhancer and noise reducer subsystem 26.

At the output 28, the burst will be restored to a level between 10 and 15 IRE units, depending upon the qualities desired in restorative video enhancement. At a 10 IRE unit restoration, the detail level of the video images appears as though the video had passed through a 2.5 MHz low pass filter: i.e., there is a slight degradation of detail and a very significant noise reduction. At a 15 IRE unit restoration, the detail level of the video images gives the illusion of a full bandwidth (4.2MH MHz) picture. Actually, a full bandwidth is not present, as there is an excess of mid frequency components. With the preshoot and overshoot introduced by video crispening to improve transitions, the illusion of full bandwidth is striking.

In any event it, will be appreciated by those skilled in the art that the principles of the present invention apply to many different kinds of signal paths through which television signals must pass, and although the preferred embodiment is found in the setting of a video tape recorder, other applications and embodiments will be readily apparent from a thoughtful consideration of the present disclosure.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

I claim:

1. In a television system, a method for automatic adjustment of a low television signal transition level processor including image enhancement and noise reduction processes for operating upon a television signal which is degraded by losses in low level picture transitions occurring throughout the gray scale upon passage through a degrading medium having a predetermined degradation characteristic, said method comprising the steps of:
   a. generating a pilot signal having an amplitude and frequency selected to be representative of said video transitions susceptible to degradation during passage through said medium;
   b. adding said pilot to the television signal prior to its passage through said degrading medium;
   c. passing said television signal through said degrading medium;
   d. image enhancement and noise reduction processing of said television signal under automatic control of said pilot following passage through said degrading medium by performing the additional steps of:
      (1) recovering said pilot signal;
      (2) converting said recovered pilot signal to an automatic control signal related to the amplitude of said recovered pilot signal;
      (3) applying said recovered pilot signal to said signal processor to carry out said image enhancement and noise reduction processes with at least one operating parameter thereof automatically adjusted by said automatic control signal.

2. In a television system, a method for automatic adjustment of a low level television transition signal processor operating upon a television signal subject to degradation by losses in low level picture transitions occurring throughout the gray scale range upon passage through a degrading medium, said method comprising the steps of:
   a. generating a pilot signal having an amplitude level and frequency selected to be representative of the components of said television signal most likely to be degraded by passage through said degrading medium;
   b. adding said selected pilot signal to the television signal prior to its passage through said degrading medium;
   c. pre-boosting low level television transitions in said pilot-signal-containing television signal with first image processing prior to its passage through said degrading medium;
   d. passing said television signal through said degrading medium;
   e. enhancing said television signal by removing said pre-boost therefrom by operation of second image processing following passage through said degrading medium, and performing the additional steps of:
      (1) recovering said pilot signal;
      (2) converting said recovered pilot signal to an automatic adjustment control signal related to the amplitude of said recovered pilot signal; and
      (3) controlling the adjustments of said second image processing with said automatic adjustment control signal.

3. In a television image enhancement system, a method for automatic control of a low level television transition processor operating upon a television signal subjected to degradation by losses in low level picture transitions occurring throughout the gray scale range by passage through a limited bandwidth video recorder, said method comprising the steps of:
   a. generating a pilot signal for insertion within the vertical synchronizing pulse interval, said signal having a predetermined amplitude level in a range from 1 to 30 IRE units and a predetermined frequency in a range between 1.5 and 2.0 MHz;
   b. adding said selected pilot signal to the vertical interval of said television signal prior to its passage through said degrading medium;
   c. pre-boosting said pilot-signal-containing television signal with first image processing prior to its passage through said medium by selectively boosting amplitudes of low level picture transitions occurring throughout the gray scale range of said signal;
   d. passing said television signal through said medium;
   e. processing said television signal with second image processing following passage through said medium, and performing the additional steps of:
      (1) recovering said pilot signal;
      (2) converting said recovered pilot signal to an automatic adjustment control signal related to the amplitude of said recovered pilot signal; and, (3) controlling automatically the adjustments of said second image processing with said automatic adjustment control signal.

4. The method as set forth in claim 1 or 2 wherein said pilot signal is added to said television signal in the vertical sync interval after occurrence of the vertical sync pulse.

5. The method as set forth in claim 4 wherein said burst is added to a plurality of said lines in a range between line number 10 and line number 16 in the vertical interval.

6. The method as set forth in claim 1, 2, or 3, wherein said automatic adjustment control signal is generated from an average of amplitudes of pilot signals sampled over a plurality of recurrent frames of said television signal.

7. The method set forth in claim 1, 2, or 3, wherein the step of processing said television signal following passage through said degrading medium includes the additional step of removing said pilot signal from said television signal upon completion of said processing.

8. The method set forth in claim 2 or 3 wherein said pre-boosting step comprises the step of boosting signal transitions below a predetermined absolute magnitude and regardless of amplitude levels at said transitions to an amplitude level above rolloff of said degrading medium.

9. An automatic control system for automatic adjustment of a television signal processing path which includes a signal-degrading element, said system comprising:
   an input for receiving a composite video signal,
   pilot burst reference signal generator means connected to said input for generating a periodic, low level pilot signal having a predetermined low amplitude level and frequency, both selected to be representative of low transition level signals occurring throughout the gray scale range which are most susceptible to degradation by passage through said limited bandwidth element,
   a summing junction connected to said input and to said generator means for combining said pilot signal with said composite video signal,
   video signal enhancement preprocessing means connected to said summing junction for preprocessing said pilot-signal-containing video signal prior to its passage through said signal degrading element by preboosting video transitions below forty IRE units in accordance with a predetermined signal boost profile,
   said signal-degrading element being connected to said video signal preprocessing means so that said preprocessed video signal passes therethrough and becomes degraded thereby,
   video signal post-degradation processing means connected to said signal degrading element to receive video after passage therethrough and consequent degradation, said post-degradation processing means including:
   pilot signal recovery means for recovering said pilot signal,
   conversion means for converting said recovered pilot signal to an automatic control signal related to actual recovered amplitude of said pilot signal in further relation to said nominal amplitude of said pilot signal,
   video signal restoration means connected to said signal degrading element and including controlled amplifier means connected to said conversion means for selectively reducing the amplitudes of said low level transitions in an amount automatically controlled by said automatic control signal.

10. The automatic control system set forth in claim 9, wherein said video preprocessing means comprises:
   a linear signal path from an input to an output,
   low transition level signal expansion circuit means connected in parallel with said linear path for generating and adding to said path a nonlinear axially symmetrical signal complement which, when combined in proper time relationship with the low transition level video signal below a predetermined level on said path, increases the instantaneous amplitude generally by the amount corresponding to said level so as to provide said signal boost profile,
   said signal complement being generated from said low transition level video signal but not for video transitions above said level, so that said low transition level signal expansion circuit means is inoperative for video transition signals initially above said level.

11. The automatic control system set forth in claim 9, wherein said video signal restoration means further comprises:
   a post-degradation processing input connected to receive degraded composite video from said signal degrading element,
   comb filter means connected to said post-degradation processing input for separating luminance and chrominance components,
   chrominance processor means connected to said comb filter means for enhancing chrominance transitions by shortening transition time thereof in accordance with luminance transition information,
   luminance processor means connected to said comb filter means for enhancing luminance transitions, said luminance processor means comprising:
      low frequency band pass filter means for passing low frequency components of luminance below a predetermined frequency,
      high frequency band pass filter means for passing high frequency components of luminance above said predetermined frequency,
      threshold circuit means connected to said high frequency band pass filter means for passing those of said high frequency components which have magnitudes above a variable threshold level set automatically by said automatic control signal,
      horizontal component enhancement means connected to said high frequency band pass filter means for enhancing horizontal transitions by shortening transition times thereof in accordance with a variable horizontal enhancement level set automatically by said automatic control signal,
      combiner circuit means connected for combining low frequency luminance components from said low frequency band pass filter means, enhanced horizontal components from said horizontal component enhancement means, high frequency luminance components from said horizontal threshold circuit means, and enhanced vertical domain components from said comb filter means to provide enhanced luminance, and
   summing circuit means connected for combining in proper time and phase enhanced chrominance from said chrominance processor means and enhanced luminance from said luminance processor means to put out enhanced composite color video.

12. The automatic control system set forth in claim 11 further comprising pilot signal removal means connected between said combiner circuit means and said summing circuit means for removing said pilot signal from said composite color video.

13. The automatic control system set forth in claim 9 wherein said pilot signal recovery means comprises:

band pass filter means having a pass band for selectively passing said pilot signal, full wave rectifier means connected to said band pass filter means for full wave rectifying said pilot signal, sample and hold circuit means connected to said full wave rectifier means and to a source of television synchronizing information for sampling and holding said rectified pilot signal for the duration of each field, wherein the held value is a DC signal linearly related to pilot signal amplitude, said sample and hold circuit means including shaping circuit means for nonlinear processing of said held value to provide said automatic control signal.

14. The automatic control system set forth in claim 13 wherein said pilot signal recovery means further comprises plural field integrator means connected to said sample and hold circuit means for integrating the held and shaped automatic control signal over a plurality of video fields, thereby yielding a flywheel dampened automatic control signal which averages said control signal in real time and resists sudden changes therein.

15. The automatic control system set forth in claim 9 wherein said pilot signal generator means is adapted for generating said pilot signal as a burst having a frequency in a range between 1.5 and 2.0 Megahertz, an amplitude in a range between 1 and 30 IRE units and for inserting said burst periodically in the vertical synchronizing pulse interval of said signal in a range between lines 10 and 16.

* * * * *